(No Model.)

S. W. LUDLOW.
VEHICLE SPRING.

No. 290,251. Patented Dec. 18, 1883.

ATTEST.
Walter W. Chamberlin
Ed R. Hill

INVENTOR.
Samuel W. Ludlow
per Wm. Hubbell Fisher
Atty.

UNITED STATES PATENT OFFICE.

SAMUEL W. LUDLOW, OF CINCINNATI, OHIO, ASSIGNOR OF ONE-FOURTH TO JAMES FITTON.

VEHICLE-SPRING.

SPECIFICATION forming part of Letters Patent No. 290,251, dated December 18, 1883.

Application filed May 22, 1883. (No model.)

*To all whom it may concern:*

Be it known that I, SAMUEL W. LUDLOW, a resident of the city of Cincinnati, in the county of Hamilton and State of Ohio, have invented certain new and useful Improvements in Vehicle-Springs and their Connections, of which the following is a specification.

The nature of my invention, its various features, and the several advantages arising from their employment, conjointly or otherwise, will be apparent from the following description.

Figure 1:
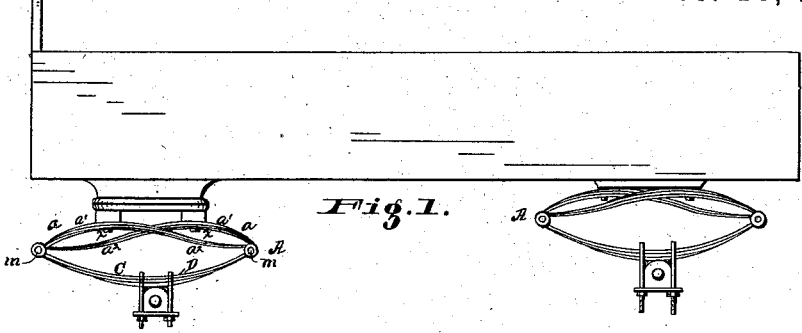
Figure 3:
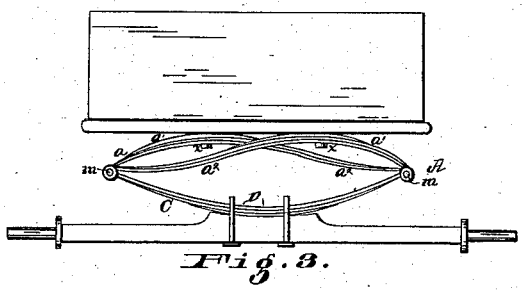
Figure 2:
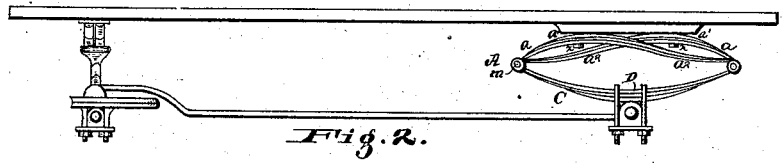
Figure 4:
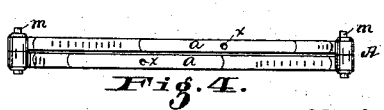
Figure 5:
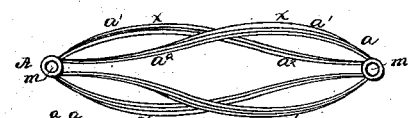
Figure 6:
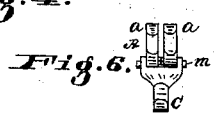
Figure 7:

In the accompanying drawings, forming part of this specification, Figure 1 is a side elevation of a vehicle provided with springs embodying my invention, and showing one mode of arranging the springs with reference to the vehicle. Fig. 2 is a side elevation of a vehicle-bed and running-gear provided with springs embodying my invention, and showing another mode of arranging the springs. Fig. 3 is a rear elevation of a vehicle, illustrating another mode of arranging the springs. In these three figures the wheels are omitted, as their presence would detract from the perspicuity of the drawings. Fig. 4 is a plan view of a spring embodying my invention. Fig. 5 shows in side elevation a spring embodying a modification of my invention. Fig. 6 represents an end elevation of the compound spring shown in Fig. 1. Fig. 7 represents an end elevation of the compound spring illustrated in Fig. 5.

The principal objects of my invention are, first, to provide a spring which shall effectually and readily withstand any thrusts to which the vehicle may be subjected in the direction of the length of the spring; secondly, to provide a spring which shall become an equalizer, and when the weight or strain is brought upon the spring through its points of connection with the vehicle and running-gear in such a manner as shall tend to throw down or depress one of the ends of the spring, this strain shall be communicated to all parts of the spring, and shall be resisted by compelling the elasticity of all parts of the spring to co-operate to resist the strain and cause the strain to be equalized, one portion of the spring, furthermore, acting as a brace for the others; thirdly, to provide a spring which, while accomplishing the aforementioned objects, shall be elastic and resilient.

A indicates the spring. The upper half consists of two members, $a$ $a$, lying in two vertical planes which are parallel to one another, or substantially so. These members are placed near together. Each member $a$ is a spring forming a compound curve, $a'$ $a^2$, of which curve the part $a'$ is highest and is nearest one end of the spring, while the other part, $a^2$, of the curve is nearest the other end of the spring. In relation to each other the spring members $a$ are oppositely arranged—that is to say, the highest part $a'$ of one spring member is near one end of the compound spring A, and the highest part of the other spring member $a$ is near the other end of the compound spring A. Those ends of the two members $a$ which are at the right-hand side (say in Fig. 1) of the spring A are connected to a common pin or bolt, $m$, and those ends of said members $a$ which are at the left hand of the spring A are connected to a common bolt or pin, $m$. These ends of the members $a$ are free to work on their respective end connections.

That portion, C, of the spring A which is opposite to the members $a$ consists of a suitable spring or springs united at one end to one of the pins or bolts $m$, and at the other end to the other of the pins or bolts $m$, and working freely on said pivots, preferably in the usual manner, as shown in Figs. 1, 2, and 3. This portion C preferably consists of one member—viz., a semi-elliptical spring, D, of the usual form of two semi-elliptical springs placed side by side. Each of the members $a$ is connected to the vehicle at or near the point $x$, in the usual manner. Where the lower member consists of the usual semi-elliptic spring or springs, the latter will be connected to the vehicle at or near its middle portion.

In Fig. 1 the arrangement of my springs enables the vehicle to be constructed without perch or reach, and the lower member, C, may be connected directly to the axle.

In Fig. 2 my improved springs are employed over the rear axle, and a spring (preferably one of my improved construction) is located transversely to the length of the vehicle and over the forward axle, and a perch or reach is shown connecting the front and rear portions of the running-gear.

In Fig. 3 is shown an approved mode of combining my spring with a rear portion of a vehicle, when the spring is placed transversely to the length of the vehicle-body.

A modification of my invention, wherein the lower member, C, of the spring A consists of two springs of substantially the same form as the members $a\ a$, heretofore described, is shown in Fig. 5. Where this modification is employed, the lower spring, $a$, will be connected to the vehicle at the points $x\ x$. The springs $a$ may be re-enforced, as desired, with supplemental leaves.

What I claim as new, and desire to secure by Letters Patent, is—

1. In combination with an opposing semi-elliptic spring or springs, the spring members $a\ a$, each consisting of the curves $a'\ a^2$, one of the spring members $a$ having the middle of its curve $a'$ to the left of the middle of the spring, and the other spring member $a$ having the middle of its curve $a'$ to the right of the middle of the spring, the springs $a\ a$ and the semi-elliptic spring being connected together at their ends, and the springs $a\ a$ being connected to the vehicle at or near the points $x\ x$, substantially as and for the purposes specified.

2. In combination with an opposing spring member or portion, C, the spring members $a\ a$, each of the latter consisting of the curves $a'\ a^2$, one of the spring members having the middle of its curve $a'$ to the left of the middle of the spring, and the other spring member $a$ having the middle of its curve $a'$ to the right of the middle of the spring, the springs $a\ a$ and the spring member or portion C being connected together at their ends, and the springs $a\ a$ being connected to the vehicle at or near the points $x\ x$, substantially as and for the purposes specified.

3. In combination with an opposing spring member or portion, C, the adjacent spring members, each having a curve, $a'$, said curves $a'$ together forming an extended bearing with the length of the spring, the opposing spring member or portion C and said adjacent spring members being connected together at their ends and forming one spring, substantially as and for the purposes specified.

SAMUEL W. LUDLOW.

Attest:
J. WM. STREHLI,
MILTON HILL.